Feb. 26, 1952    V. A. MEAD    2,586,847
LATCH RELEASE MECHANISM
Filed Feb. 13, 1946

Inventor
VINCENT A. MEAD

By F. J. Schmitt
Attorney

Patented Feb. 26, 1952

2,586,847

UNITED STATES PATENT OFFICE 2,586,847

LATCH RELEASE MECHANISM

Vincent A. Mead, United States Navy

Application February 13, 1946, Serial No. 647,408

5 Claims. (Cl. 292—207)

(Granted under the act of March 3, 1883, as amended April 30, 1928; 370 O. G. 757)

This invention relates to a latch release mechanism and particularly to a release mechanism for submerged doors or hatches on aircraft, vessels, or receptacles.

This application is a continuation-in-part of application No. 593,898 filed May 15, 1945 and now Patent Number 2,470,783, issued May 24, 1949.

Great difficulty has been encountered in the case of sunken aircraft, receptacles, and the like in opening escape doors and hatches because of hydrostatic pressure from the outside. This has often resulted in serious loss of life and property and has created a need for a latching mechanism which not only provides manual unlocking means but utilizes hydrostatic pressure to open the hatch and permit escape.

An object of this invention is to utilize a single latching hydrostatic release mechanism for doors or hatches in which the release can be unlocked either manually or by hydrostatic pressure.

Details of the invention are described in connection with the following drawings in which.

Figure 2:
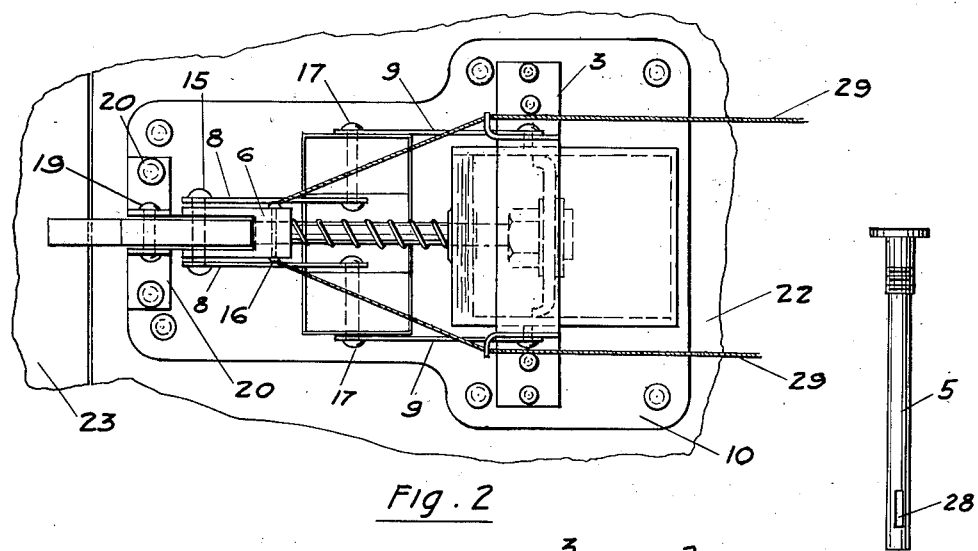
Fig. 2 is a plan view.
Figures 1, 4, 5:
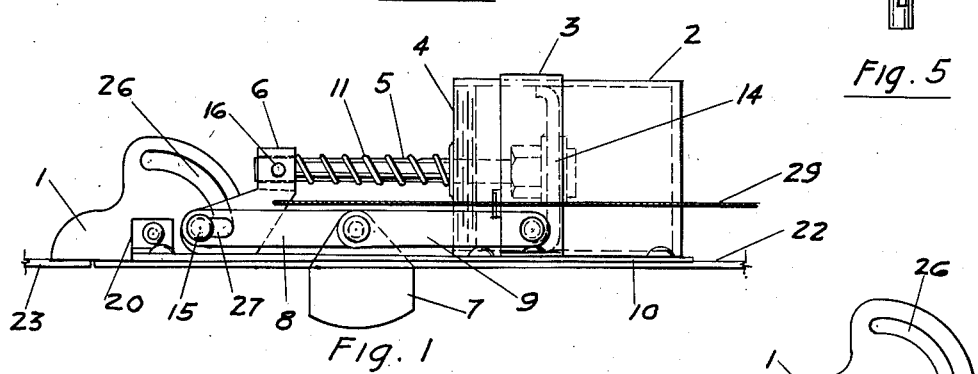
Fig. 1 is an elevation of the latching mechanism.
Fig. 4 shows the latch member.
Fig. 5 is an elevation of the piston rod.

In the drawings, Figs. 1 and 2 show the latching mechanism secured to the escape door or hatch 22 on aircraft. Essentially, the latching device is intended for use on airplanes. However, it is apparent that it can also be used on any vessel or receptacle which might become submerged, and should be of great value in automatically releasing life rafts and other life-saving equipment.

The latching mechanism is secured to the outside of the hatch and is provided with latch 1 which engages the fuselage or bulkhead 23 of the sunken plane or receptacle. It will be apparent that by unlocking the latch 1, hydrostatic pressure on the outside of the hatch will force it inwardly when submerged, thereby permitting escape. The present latching mechanism is provided with both manual and hydrostatic devices for unlocking the latch, as will become apparent as the description proceeds.

Figure 3:
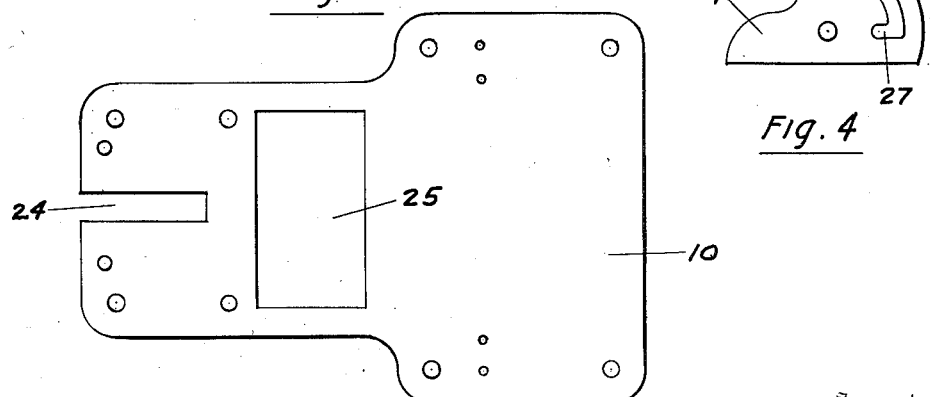
Fig. 3 is a plan view of the mounting plate.

The latching mechanism is provided with mounting plate 10 adapted to be secured to the hatch, as shown, by suitable means such as rivets so as to become in effect a part of the hatch. Details of the mounting plate are shown in Fig. 3. It will be seen that mounting plate 10 is provided with slot 24 at its forward end and with opening 25 near its center portion for a purpose later described.

Angular brackets 20 are secured to mounting plate 10 on opposite sides of slot 24 in any suitable manner. Latch member 1 is mounted between brackets 20 by means of pin or rivet 19 and is free to pivot in slot 24. Arcuate slot 26 communicating at one end with radial slot 27 is provided in latch member 1 to receive locking pin or rivet 15 as shown in Fig. 1. It will be apparent that pin 15 when within radial slot 27 locks latch member 1 against rotation. Withdrawal or retraction of pin 15 from radial slot 27 into the arcuate slot unlocks latch member 1 and permits free movement of locking pin 15 in arcuate slot 26, thereby leaving latch member 1 free to rotate on pin 19, as permitted by notch 24 and a corresponding underlying opening (not visible) in the door 22. In locked position latch member 1 engages bulkhead or fuselage 23 and prevents opening of the hatch 22. However, when unlocked, the hatch can be readily opened; and if submerged, hydrostatic pressure on the outside surface of the door or hatch will supply the necessary force to open the door and permit escape.

Locking pin 15 can be retracted in one of several ways, each of which will become apparent as the description proceeds.

Cylinder 2, containing piston 14, is affixed to mounting plate 10 by means of U-shaped strap 3. Piston 14 may be a gasket without departing from the scope of the invention. Piston rod 5 is connected to the piston and projects forward terminating in an elongated slot 28 as shown in Fig. 5. Cylinder 2, closed at one end and open at the piston rod end, is covered with perforated disc 4. The perforations permit water to enter the cylinder and to thereby apply a force to move the piston against the air cushion in the back of the cylinder.

The forward end of piston rod 5 is received by release fitting 6. This release fitting is preferably of substantially angular shape. The upright leg is provided with a perforation of a size to receive the forward end of piston rod 5. Pin 16 extends through elongated slot 28 to permit limited relative movement between release fitting 6 and piston rod 5. Spring 11 extends between release fitting 6 and perforated disc 4 to urge the release fitting forward. The lower portion of angular release fitting 6 consists of spaced legs which contain locking pin 15. Forward movement of the release fitting causes locking pin 15 to be inserted in radial slot 27, thereby locking latch member 1. Conversely, retraction of release fitting 6 results in retraction of locking pin 15 permitting latch 1 to rotate on pin 19, thereby permitting the hatch to be opened by means of properly applied manual or hydrostatic forces.

Manual means are provided to supplement the hydrostatic piston-operated relase. Lines 29 are shown extending from release fitting 6 to the pilot, whereby the release fitting and locking pin can be retracted.

Another manual means is provided as shown. This consists of link arms 9 pivoted to opposite sides of U-shaped strap 3 and link arms 8 provided with elongated slots at the forward end pivoted on opposite sides of release fitting 6 to locking pin 15. Link arms 8 and 9 are pivotally connected together and to button 7 by means of suitable pins 17. Button 7 extends through perforation 25 in mounting plate 10 and is accessible on the inside of the door. Outward manual pressure on the button will cause link arms 8 and 9 to swing with a toggle action and thus retract the release pin and fitting.

Elongated slot in link arms 8 and elongated slot in piston rod 5 permit sufficient free play so that movement of one operating means can take place without interference from the other operating means.

While I have shown a particular embodiment of my invention, it will be understood, of course, that I do not wish to be limited thereto, since many modifications may be made, and I, therefore, contemplate by the appended claims to cover any such modifications as fall within the true spirit and scope of my invention.

The invention described herein may be manufactured and used by or for the Government of the United States of America for governmental purposes without the payment of any royalties thereon or therefor.

What is claimed is:

1. A latch for securing a door to a wall comprising, a latching member and means pivotally mounting said member on said door; said latching member having an offset portion engageable with said wall structure, and further having a long continuous slot, comprising an arcuate portion concentric to the pivotal axis and a shorter radial portion opening into the arcuate portion; said door having a slot therein in alignment with said latching member to permit the latter to swing therethrough so that the door may be opened; a transverse locking pin in the radial portion of the slot and bridging the door slot and movable into said arcuate portion; and unlocking means connected to said pin and operable to force it from said radial portion into said arcuate portion.

2. In the combination of claim 1, said unlocking means comprising a pair of toggle joint arms connected to the ends of said pin, and to said door, and mechanism for shifting said arms.

3. In the combination of claim 1, said unlocking means comprising mechanism operable from the inside of the door structure.

4. In the combination of claim 1, said unlocking means comprising mechanism operable externally of the door structure.

5. A latching mechanism comprising a mounting plate; a latch plate secured to said mounting plate for pivotal movement normal to the plane of the mounting plate, said latch plate having an engaging member radially projecting from the edge thereof, an arcuate slot concentric to the latch plate pivot and a radial slot communicating with said arcuate slot; locking means including a pin positioned within said radial slot and movable to said arcuate slot and including stops integral with said mounting plate and engageable with the pin ends for retaining the latch plate in fixed position while said pin is within said radial slot; and lock-release means for normally retaining said pin in said radial slot but movable to force said pin outwardly in said radial slot into said arcuate slot, thereby to permit rotation of said latch plate and release of said latch.

VINCENT A. MEAD.

REFERENCES CITED

The following references are of record in the file of this patent:

UNITED STATES PATENTS

| Number | Name | Date |
|---|---|---|
| 222,577 | Coulter | Dec. 16, 1879 |
| 512,593 | Webster et al. | Jan. 9, 1894 |
| 1,007,398 | Snider | Oct. 31, 1911 |
| 1,024,603 | Schmidgall | Apr. 3, 1912 |
| 1,038,624 | Messick | Sept. 17, 1912 |
| 1,336,430 | Gustafson | Apr. 13, 1920 |
| 1,462,637 | Fetner | July 24, 1923 |
| 1,541,046 | Hall | June 9, 1925 |
| 1,937,978 | Miller | Dec. 5, 1933 |
| 2,274,711 | Krause | Mar. 3, 1942 |